United States Patent

Koons

[15] 3,690,525
[45] Sept. 12, 1972

[54] SUPPORT FRAME FOR USE WITH AN INFANT'S CAR SEAT-BED ASSEMBLY OR AS A SHOULDER SUPPORTED PACK CARRIER

[72] Inventor: Albert Eugene Koons, Proctor Star Route, Williamsport, Pa. 17701

[22] Filed: Dec. 23, 1970

[21] Appl. No.: 101,043

[52] U.S. Cl. ..............................224/9, 5/94, 224/6, 224/25 A, 297/255
[51] Int. Cl. ............................................A46f 4/02
[58] Field of Search ....297/254, 255, 256; 5/94, 118; 224/8 R, 9, 6, 25 R, 25 A, 29 D, 42.42 A

[56] References Cited

UNITED STATES PATENTS

| | | | |
|---|---|---|---|
| 2,805,704 | 9/1957 | Avseev | 297/255 |
| 3,428,361 | 2/1969 | Reynolds | 297/256 X |
| 3,505,691 | 4/1970 | Reynolds | 297/256 X |
| 2,836,334 | 5/1958 | Davis | 224/25 A |

Primary Examiner—Robert G. Sheridan
Attorney—Brady, O'Boyle & Gates

[57] ABSTRACT

A support frame for use with an infant's car seat-bed assembly or as a shoulder supported pack carrier, the support frame including hook portions at one end thereof adapted to engage the upper edge portion of the back of a car seat when used with an infant's car seat-bed assembly, or on the shoulders of a person when used as a pack carrier; the opposite end of the frame having a detachable hook member adapted to engage the lower edge portion of the back of a car seat, the frame also includes socket members adapted to selectively receive portions of hinge members mounted on an infant carrier whereby the infant carrier may be supported on the frame as a seat or as a bed; a bail being pivotally connected to the support frame and adapted to support the infant carrier in various inclined positions when mounted on the support frame as an infant's car seat.

11 Claims, 12 Drawing Figures

PATENTED SEP 12 1972  3,690,525

INVENTOR
A. EUGENE KOONS

BY *Brady, O'Boyle & Gates*

ATTORNEYS

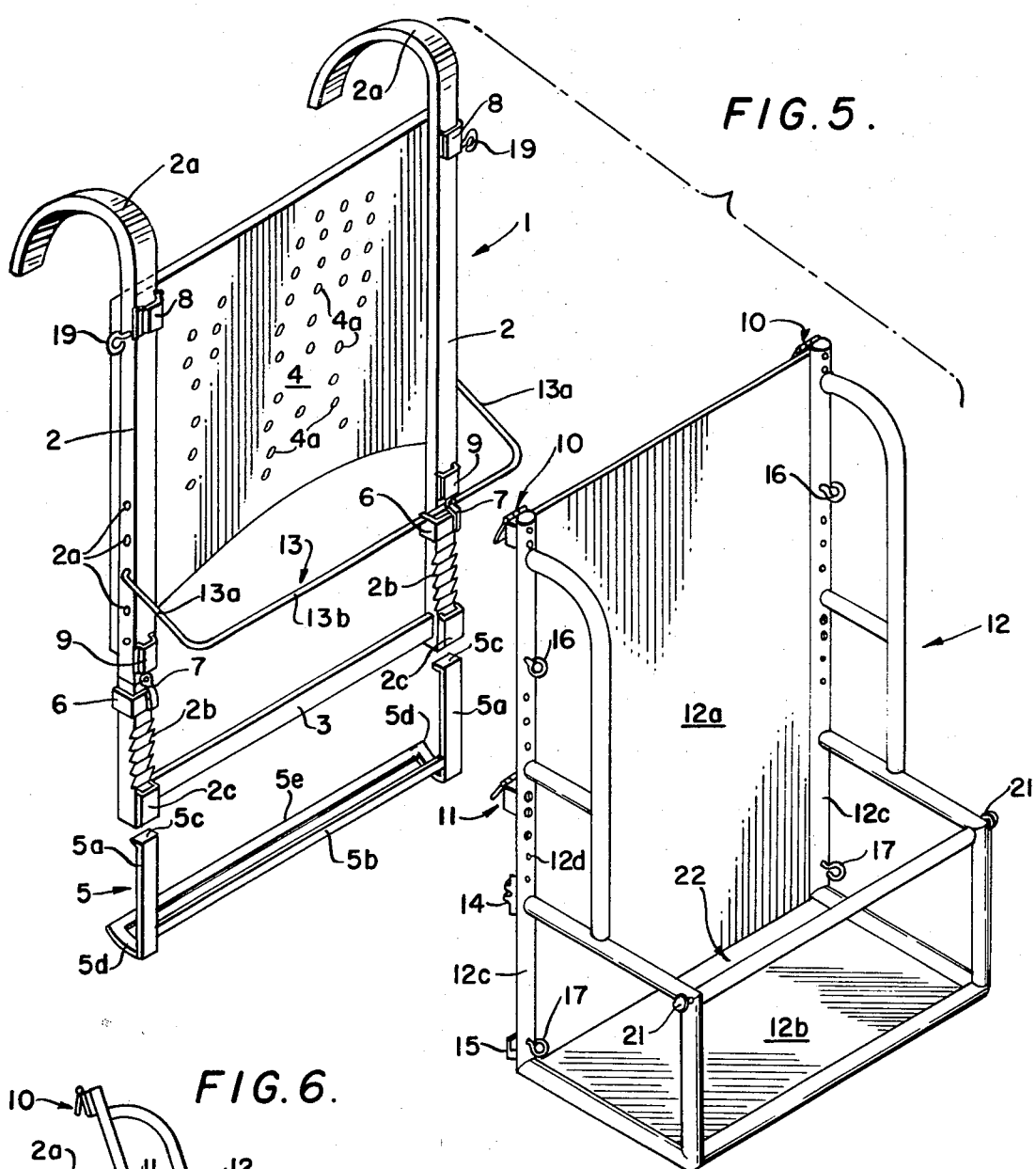

INVENTOR
A. EUGENE KOONS

BY Brady O'Boyle & Gates
ATTORNEYS

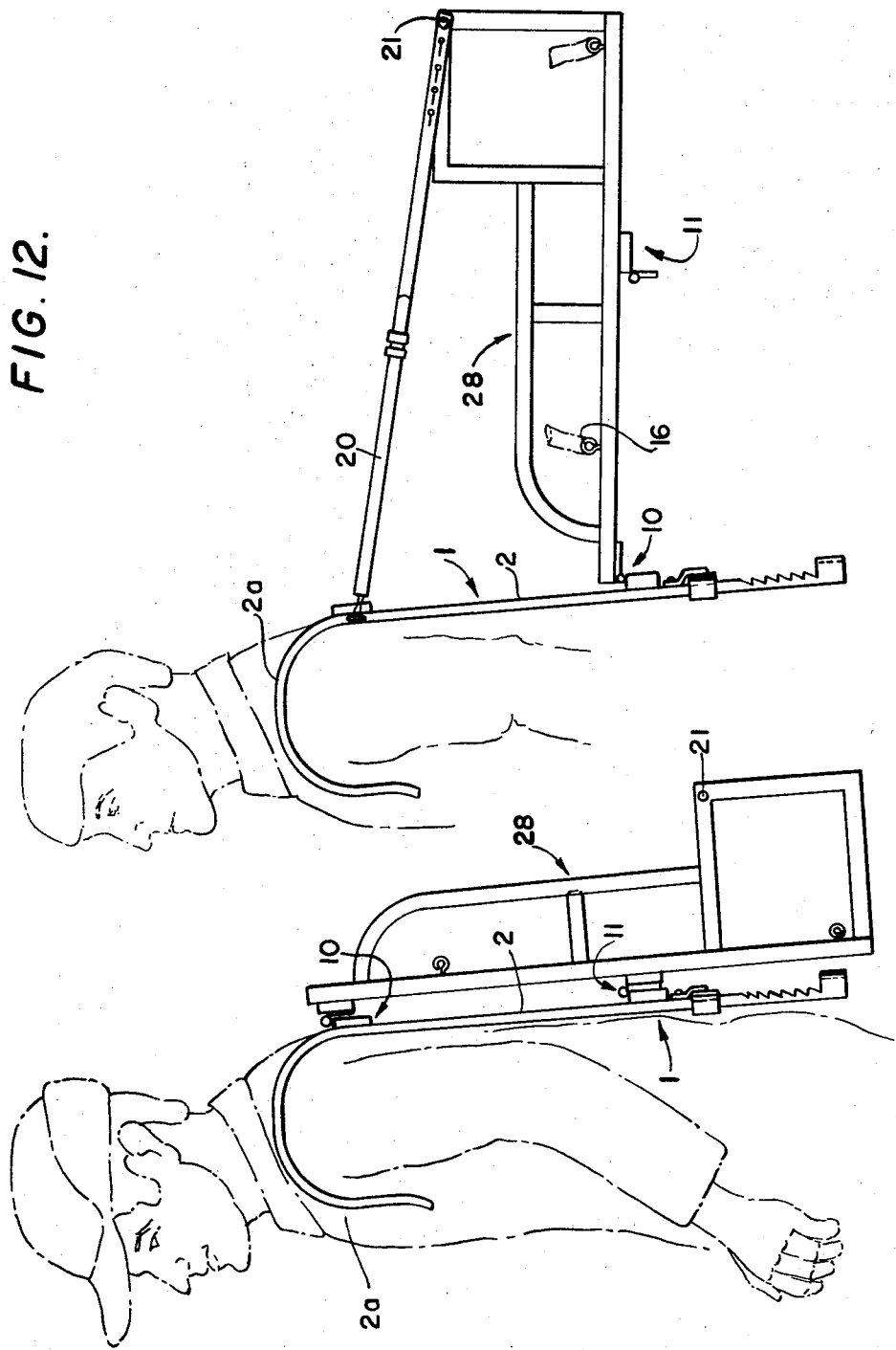

SUPPORT FRAME FOR USE WITH AN INFANT'S CAR SEAT-BED ASSEMBLY OR AS A SHOULDER SUPPORTED PACK CARRIER

Heretofore, various infant's car seat-bed assemblies have been proposed wherein the infant's car seat is convertible to a bed. While these assemblies have been satisfactory for their intended purpose, they have been subject to certain objections particularly in regard to the manipulation of the assembly from a seat to a bed and vice versa. In many of these assemblies, when used as a car seat, the seat is hooked over the back of the vehicle seat in a fixed position; thus, there is no provision for positioning the seat in various inclined positions to accommodate the comfort of the child in the seat. When manipulating the seat to a bed, it was necessary to dismantle the assembly from the back of the car seat and reconstruct it as a bed supported on the seat of the car.

Yet still another disadvantage in hitherto employed infant car seat-bed assemblies is the relatively early obsolescence of the assembly due to the rapid growth of the infant.

To overcome the disadvantages experienced in prior infant's car seat-bed assemblies, the support frame of the present invention has been devised which is adapted to support an infant's car seat-bed assembly such that when used as a seat the assembly may be adjusted to various inclined positions, and when used as a bed, the seat is manipulated to a horizontal position while being supported on the back rest of an automobile seat. After the car seat-bed assembly has become obsolete due to the growth of the child, the assembly may be removed from the support frame which can then be employed as a pack carrier supported on the shoulders of a person.

In the Drawings

FIG. 5 is a perspective view of the support frame and infant's seat detached therefrom;

FIG. 6 is a view taken along line 6—6 of FIG. 1;

FIGS. 7 and 8 are perspective views of latches employed in the assembly for receiving a bail which inclines the seat to various positions;

FIGS. 11 and 12 are side elevational views showing the assembly of the present invention employed as a pack carrier.

Figure 1:
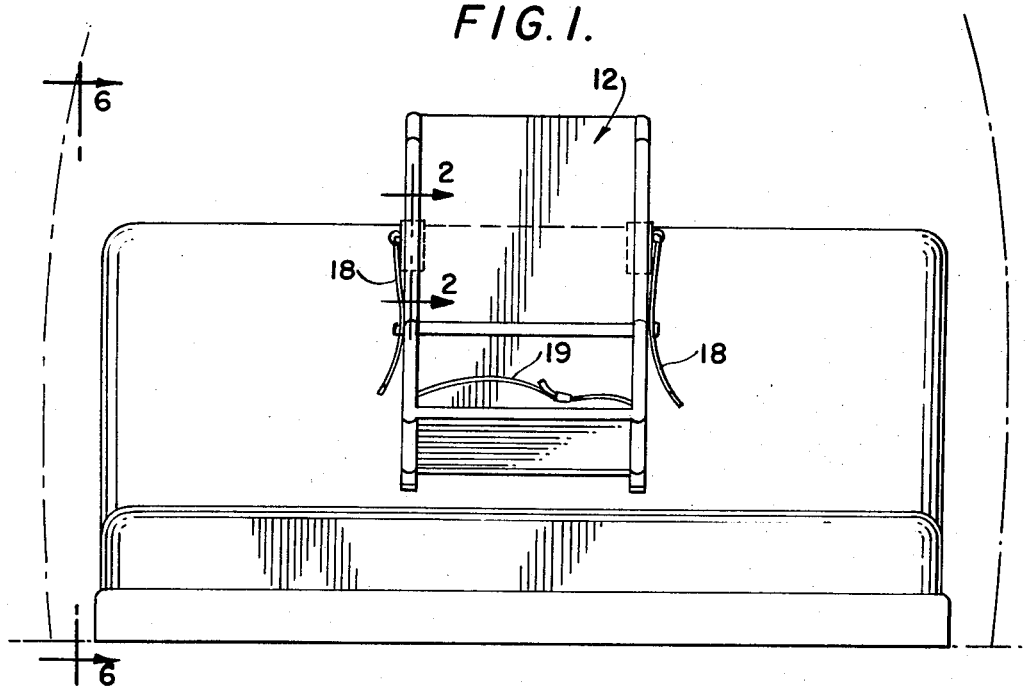
FIG. 1 is a front elevational view of the assembly of the present invention employed as an infant's car seat mounted on the back of a vehicle seat.

Referring to the drawings and more particularly to FIG. 5, the support frame 1 of the present invention comprises a pair of spaced leg members 2, rigidly held in parallel relationship by a transversely extending arm 3 extending between the lower end portions of the legs, and a rigid panel 4 extending between the upper portions of the leg members. The upper ends of the legs terminate in hook portions 2a adapted to be supported on the upper edge of the back of a vehicle seat, or on the shoulders of a person, the lower ends of the legs having serrated portions 2b and channel members 2c which cooperate with a hook member 5 for securing the support frame to the lower edge of the back of a vehicle seat, as shown in FIG. 6.

The hook member 5 comprises a pair of parallel, spaced leg members 5a interconnected by a transverse arm 5b, the upper ends of the legs terminate in flanges 5c which are adapted to engage the serrated portions 2b formed in the legs 2 of the support frame. The lower ends of the leg members 5a terminate in hook portions 5d interconnected by a transverse member 5e. The hook member 5 is secured to the legs 2 of the support frame by inserting the legs 5a through the channels 2c and causing the flanges 5c to become engaged in a selected groove of the serrated portions 2b. In order to hold the flanges 5c in the serrated portions, each leg 2 of the support frame is provided with a collar 6 which is adapted to slide over the hook leg portions 5a to thereby bias the flanges 5c into the serrated portions. Leaf springs 7 are mounted on the legs 2 to hold the collars 6 in inoperative position while the hook member 5 is being mounted on the support frame.

The legs 2 of the support frame are also provided with channels 8, 9 forming sockets which are adapted to selectively receive hinge members 10, 11 secured to a carrier 12 to be described more fully hereinafter. A bail 13 is also mounted on the support frame, the legs 13a of which being selectively receivable in a plurality of apertures 2d formed in the legs 2 of the support frame, the bight portion 13b of the bail being selectively received in latches 14 and 15 secured to the carrier 12.

The particular carrier 12 shown in FIG. 5 is for illustrative purposes only, since the support frame 1 is adapted to carry various types of carriers provided with the hinges 10, 11 and latches 14, 15; suffice it to say that the particular carrier shown includes rigid interconnected panels 12a, 12b, the edge portions of panel 12a having frame members 12c to which the hinges 10, 11 and latches 14 and 15 are secured. Eyelets 16 and 17 are also secured to the frame members 12c between which a conventional restraining strap 18 (FIG. 9) may be selectively connected. The legs 2 of the support frame are also provided with eyelets 19; each of which receives one end of a strap 20, the opposite ends of the straps being adapted for connection to a pair of buttons 21 mounted on a framework 22.

Figure 2:
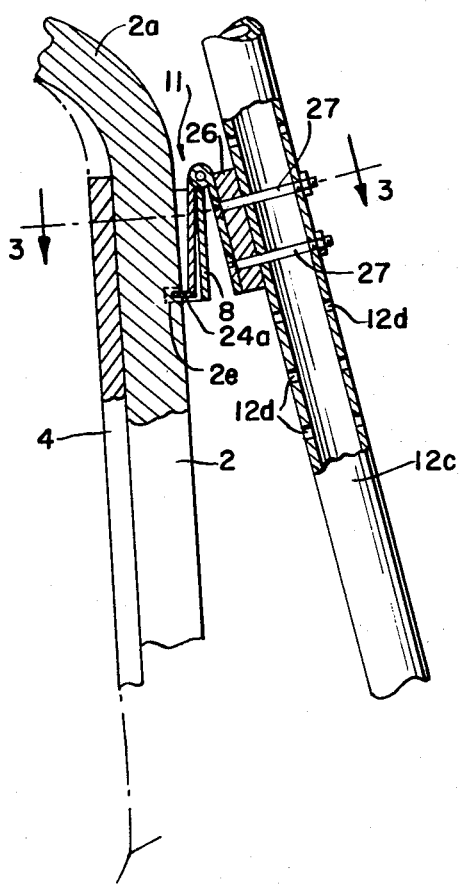
FIG. 2 is a view taken along line 2—2 of FIG. 1.
Figure 3:
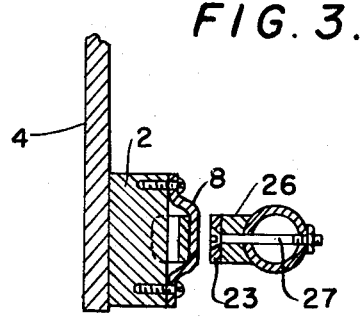
FIG. 3 is a view taken along line 3—3 of FIG. 2.
Figure 4:
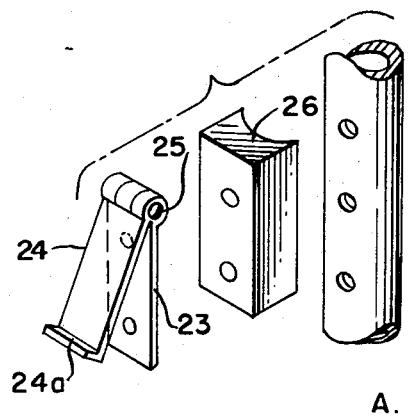
FIG. 4 is an exploded, perspective view of a hinge employed in the assembly of the present invention.

The details of the hinge members 10 and 11 are illustrated in FIGS. 2 to 4 wherein it will be seen that each hinge comprises a pair of plate members 23, 24 hingedly connected by a pintle 25, the plate 24 having a flange portion 24a adapted to be received within a recess 2e formed in the leg 2 of the support frame. The plate 23 is mounted on a spacer block 26 having bolts 27 extending therethrough, the bolts also extending through selected apertures 12d formed in the frame members 12c. By this construction and arrangement, the hinges may be adjustably mounted on the support frame.

In using the support frame of the present invention, assuming that it is to be employed for carrying an infant's car seat, the support frame 1 is mounted on the back of an automobile seat as described hereinabove, and as shown in FIG. 6. The plate members 24 of hinges 11 are inserted in channels 8 and the bail 13 is connected to either latch 14 or 15 to adjust the inclination of the seat.

Figure 9:
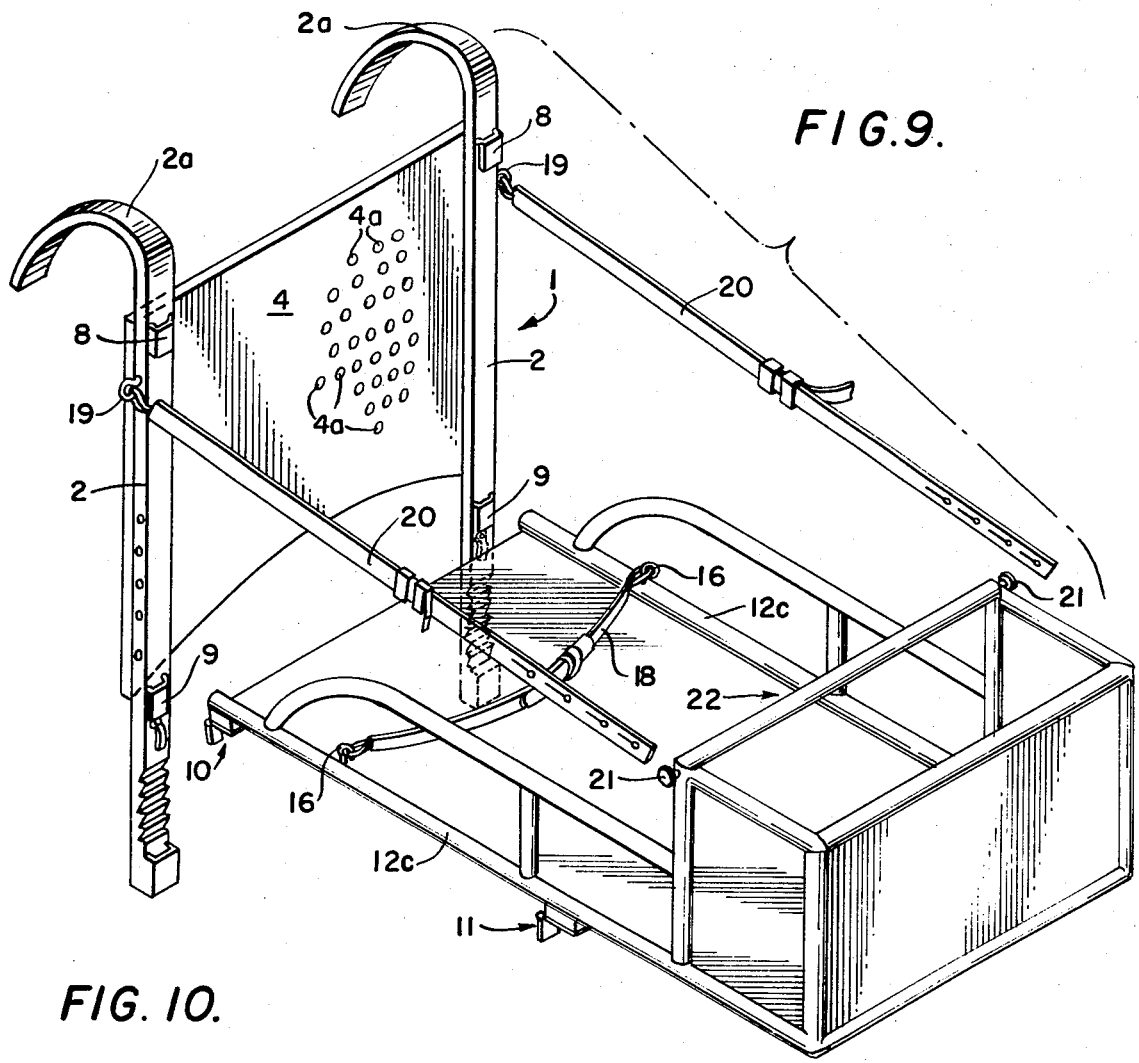
FIG. 9 is an exploded perspective view showing the position of the infant's seat relative to the support frame when manipulated to provide an infant's car bed.
Figure 10:
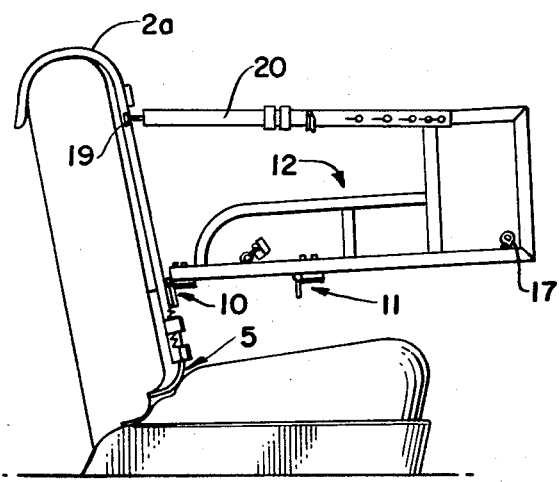
FIG. 10 is a side elevational view of the assembly of the present invention employed as an infant's car bed mounted on the back of a vehicle seat.

To convert the infant's car seat to a bed, as shown in FIGS. 9 and 10, the hinge members 10 are inserted in channels 9 and the straps 20 are connected between the eyelets 19 and 21.

The versatility of the support frame of the present invention is illustrated in FIGS. 11 and 12 wherein it will be seen that the support frame 1 can be suspended from the shoulders of a camper or hunter for supporting a pack carrier 28 which can be mounted in a vertical position as shown in FIG. 11 for carrying relatively small, light loads, or in a horizontal position, as shown in FIG. 12, for carrying large, heavy loads. When used as a pack carrier, the panel 4 would be provided with a plurality of apertures 4a for ventilation purposes.

From the above description, it will be readily apparent to those skilled in the art that the support frame of the present invention provides a novel assembly for supporting a convertible infant's car-seat bed, and which also can be employed as a support frame for a pack carrier.

The terms and expressions which have been employed herein are used as terms of description and not of limitation, and there is no intention in the use of such terms and expressions, of excluding any equivalents of the features shown and described or portions thereof but it is recognized that various modifications are possible within the scope of the invention claimed.

I claim:

1. A support frame for use with an infant's car seat-bed assembly or as a shoulder supported pack carrier comprising, a pair of spaced, parallel leg members, first channel means mounted on one end portion of each leg, second channel means mounted on the other end portion of each leg, a chair-like member having a back rest and a seat portion, hinge means mounted on said chair-like member and being selectively insertable into said first and second channel means for mounting said chair-like member on said support frame, said hinge means comprising a pair of plate members, a pintle pivotally connecting adjacent end portions of said plate members, one plate member being secured to the back rest portion of the chair-like member, the other plate member being insertable into said channel means.

2. A support frame according to claim 1 wherein a first pair of hinge means are mounted on the carrier in proximity to the upper edge portion of the back rest, and a second pair of hinge means are adjustably mounted on the back rest substantially intermediate the upper edge portion and lower edge portion of said back rest, whereby when said second hinge means are inserted into said second channel means the carrier is mounted on the support frame as a seat, when said first hinge means are inserted into said first channel means the carrier is mounted on said support frame as a bed.

3. A support frame according to claim 2 wherein strap means extends between the support frame leg members and the carrier for supporting the carrier in the bed position.

4. A support frame according to claim 2 wherein second means are detachably connected to the support frame legs in proximity to the first channel means for engaging the lower edge portion of the back rest of a vehicle seat.

5. A support frame according to claim 2 wherein a bail is pivotally mounted on the legs of said support frame, and latch means mounted on said carrier adapted to receive the bight portion of said bail, whereby the inclination of the carrier relative to the support frame may be varied when the carrier is mounted on the support frame as a seat.

6. A support frame for use with an infant's car seat-bed assembly or as a shoulder supported pack carrier comprising, a pair of spaced, parallel leg members, first channel means mounted on one end portion of each leg, second channel means mounted on the other end portion of each leg, a chair-like member having a back rest and a seat portion, connector means mounted on said chair-like member and being selectively insertable into said first and second channel means for mounting said chair-like member on said support frame, said connector means comprising a first pair of hinge means mounted on the chair-like member in proximity to the upper edge portion of the back rest, and a second pair of hinge means mounted on the back rest substantially intermediate the upper edge portion and the lower edge portion of said back rest, whereby when said second hinge means are inserted into said second channel means the chair-like member is mounted on the support frame as a seat, when said first hinge means are inserted into said first channel means the carrier is mounted on said support frame as a bed.

7. A support frame according to claim 6 wherein said second pair of hinge means are adjustably mounted on the back rest.

8. A support frame according to claim 6 wherein each hinge means comprises a pair of plate members, a pintle pivotally connecting adjacent end portions of said plate members, one plate member being secured to the back rest portion of the chair-like member, the other plate member being insertable into said channel means.

9. A support frame according to claim 6 wherein strap means extends between the support frame leg members and the chair-like member for supporting the chair-like member in the bed position.

10. A support frame according to claim 6 wherein hook means are detachably connected to the support frame legs in proximity to the first channel means for engaging the lower edge portion of the back rest of a vehicle seat.

11. A support frame according to claim 6 wherein a bail is pivotally mounted on the legs of said support frame, and latch means mounted on said chair-like member adapted to receive the bight portion of said bail, whereby the inclination of the chair-like member relative to the support frame may be varied when the chair-like member is mounted on the support frame as a seat.

* * * * *